May 24, 1927.

D. L. OULTON

ONE-WAY CLUTCH

Filed May 25, 1925

INVENTOR:
Daniel L. Oulton
By Franklin T. Phillips, Jr.
ATTORNEY:

Patented May 24, 1927.

1,629,585

UNITED STATES PATENT OFFICE.

DANIEL L. OULTON, OF EVERETT, MASSACHUSETTS, ASSIGNOR TO OULTON MANUFACTURING CORPORATION, A CORPORATION OF VERMONT.

ONE-WAY CLUTCH.

Application filed May 25, 1925. Serial No. 32,639.

My invention relates to that type of clutch wherein in combination with a driving part and a driven part there are means permitting the driving part to run freely about the driven part in one direction of rotation, while locking the two together, so that the driven part may be rotated by the driving part when the driving part is actuated in the opposite direction. It has been the special object of my invention to make a device which shall be simple and positive in operation and which shall be capable of supporting a heavy stress between the driving and the driven parts.

Figure 1:
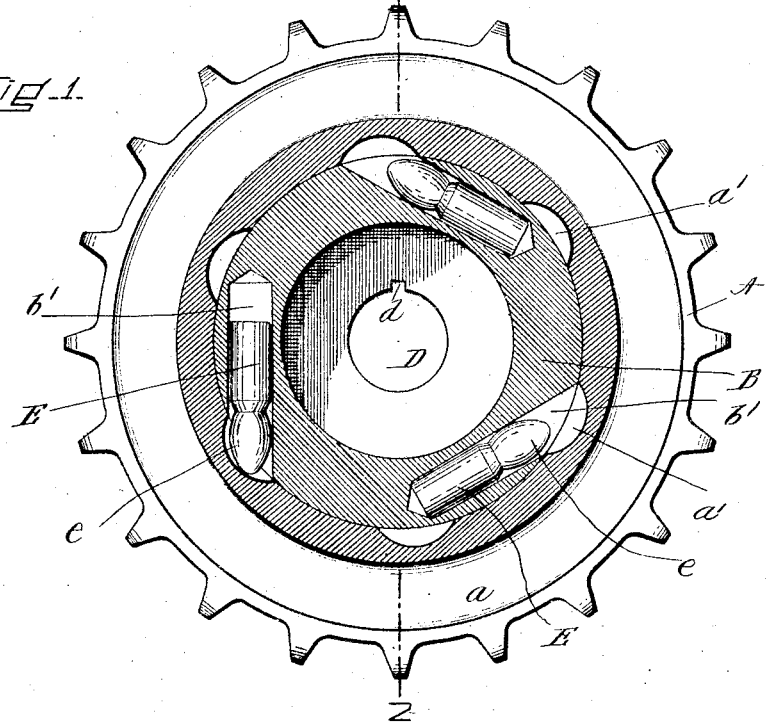

My invention may be best understood by reference to the accompanying drawings, in which Fig. 1 is a front view of my device with the inner portion of the driving part and the driven part shown partly cut away.

Figure 2:
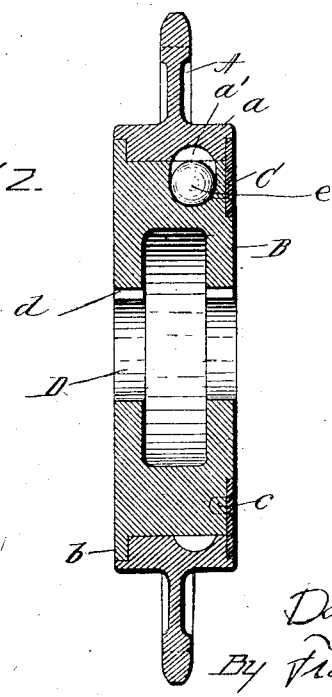

Fig. 2 is a section on line 2—2 of Fig. 1.

Referring now more specifically to the drawings, A is an annular driving sprocket in the base $a$, of which there are six pockets $a^1$. The inner faces of these pockets $a^1$ are uniformly curved in a manner to be hereinafter described. B is a hub or driven part having a snug moving fit within the annular sprocket A and retained in place with respect thereto by the flange $b$ which fits within a corresponding channel in one side of base $a$ of the sprocket A. This flange $b$ prevents the parts A and B from being dislocated with respect to each other as to separating strains from one side while they are held together with respect to strains from the other side by means of the annular plate C which overlaps the base $a$ of sprocket A and the hub B, being retained in position by screws $c$. This annular plate C is preferably set into opposite channels in the base $a$ and the hub B as shown in Fig. 2.

The hub B has the usual shaft hole D provided with a slot or key-way $d$.

In the periphery of the hub B there are three cylindrical holes $b^1$, located in the alignment of chords with respect to the circular periphery of hub B. Loosely supported within the pockets $b^1$ are cylindrical plungers E provided with rounded heads $e$. The heads $e$ are so contoured that upon entering the pockets $a^1$ one side of the head may be closely embraced by the opposite face of the pockets $a^1$ which is similarly contoured.

From observation of the relative arrangement of parts as viewed in Fig. 1 it will be apparent that upon rotation of either of the parts A and B, with respect to the other, one of the plungers E will be caused to drop by gravity so that its head $e$ will enter a pocket $a^1$. Then, if the sprocket A is rotated clockwise, the face of the pocket $a^1$ will pass over the end of the head $e$ and elevate the plunger E to a position where the annular inner face of the hub A will pass freely by the head $e$ of the plunger E in the case of any plunger which may have dropped into operative relation with sprocket A. If, however, the sprocket A is rotated anti-clockwise it will be readily apparent that the surface of pocket $a^1$ will grip the side of the head $e$ of any plunger E which is in operative position and securely bind together the sprocket A and the hub B, forming, as it were, a key seated in opposite holes in opposed surfaces of these parts. Of course, one or a plurality of the locking elements may be provided, but I prefer to provide at least three plungers E with twice that number of pockets $a^1$, in order that slight relative movement of sprocket A with reference to hub B, or vice versa, will cause a plunger to fall into operative position in pocket $a^1$. By such an arrangement there will, moreover, always be one plunger influenced by gravity toward its operatve position.

It will also be obvious that if hub B is used as the driving part rather than the driven part locking will be effected by a clockwise movement of the hub and unlocking by an anti-clockwise movement. When the hub and sprocket are locked by means of the head $e$, it is apparent that the force tending to drive them in unison in a locking direction will continue to maintain the plunger E in operative position, but when the relative driving movement of sprocket A with respect to hub B, or vice versa, is in an unlocking direction the plungers E are forced out of operative position by the contour of pockets $a^1$, by the operation of gravity, or, in case the hub B is the driven part, by the operation of rotative and centrifugal force opposed to the inertia of the plunger.

My device, by reason of the fact that it affords a broad locking contact between the head of the plunger and the side of the pocket in the sprocket A, is a distinct improvement over the well known Horton type of oneway clutch wherein the locking balls have merely points of bearing, thus unfitting the Horton type of clutch for use where heavy stresses are encountered. The Horton type of clutch, moreover, constantly presents wear to the balls which develop flat surfaces causing the parts to slip when locking strain is encountered by the balls. My device, however, presents a minimum amount of wear upon the locking members, and wear cannot render them inoperative.

Having thus fully described my invention, what I claim is,—

In a device of the character specified, the combination of an annular member provided with a pocket in its inner periphery, a member rotatably mounted within said annular member, said member being provided with a hole in its outer periphery, said hole being located in the alignment of a chord with respect to the circular periphery of said member rotatably mounted within said annular member, and a plunger slidably mounted in said hole, said plunger being provided with a rounded head one side of which is adapted to fit closely against and to be embraced by the opposed surface of said pocket, said plunger being adapted to emerge partially from said hole and to enter said pocket and to be retained therein by a driving force actuating one of said annular members in one direction and to be ejected from said pocket by a driving force actuating said member in the opposite direction.

DANIEL L. OULTON.